US010817111B1

United States Patent
Otagaki et al.

(10) Patent No.: US 10,817,111 B1
(45) Date of Patent: Oct. 27, 2020

(54) METHODS AND APPARATUS FOR A CAPACITIVE TOUCH SENSOR

(71) Applicant: SEMICONDUCTOR COMPONENTS INDUSTRIES, LLC, Phoenix, AZ (US)

(72) Inventors: Takayasu Otagaki, Ota (JP); Kazuyoshi Ishikawa, Kumagaya (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/455,218

(22) Filed: Jun. 27, 2019

Related U.S. Application Data

(60) Provisional application No. 62/831,832, filed on Apr. 10, 2019.

(51) Int. Cl.
*G06F 3/047* (2006.01)
*G06F 3/041* (2006.01)
*G06F 3/044* (2006.01)

(52) U.S. Cl.
CPC .......... *G06F 3/04164* (2019.05); *G06F 3/047* (2013.01); *G06F 3/0443* (2019.05)

(58) Field of Classification Search
USPC ................................................ 345/170–178
See application file for complete search history.

(56) References Cited

U.S. PATENT DOCUMENTS

| 7,859,521 | B2 | 12/2010 | Schwartz | |
|---|---|---|---|---|
| 8,902,189 | B2 | 12/2014 | Park | |
| 9,389,719 | B2 | 7/2016 | Li | |
| 9,405,408 | B2 * | 8/2016 | Peng | G06F 3/044 |
| 9,417,747 | B2 * | 8/2016 | Yumoto | G06F 3/044 |
| 9,496,097 | B2 | 11/2016 | Lee | |
| 9,678,594 | B2 | 6/2017 | Wang | |
| 9,684,419 | B2 | 6/2017 | Han | |
| 9,904,424 | B2 | 2/2018 | Lee | |
| 10,175,838 | B2 | 1/2019 | Otagaki | |
| 2008/0218488 | A1 * | 9/2008 | Yang | G09G 3/20 345/173 |
| 2009/0066665 | A1 | 3/2009 | Lee | |
| 2015/0002464 | A1 | 1/2015 | Nishioka | |
| 2015/0277639 | A1 | 10/2015 | Li | |
| 2015/0346889 | A1 * | 12/2015 | Chen | G06F 3/0412 345/174 |
| 2016/0041663 | A1 | 2/2016 | Chen | |
| 2016/0178461 | A1 | 6/2016 | Kim | |
| 2016/0334660 | A1 * | 11/2016 | Lin | G02F 1/1368 |
| 2017/0160866 | A1 * | 6/2017 | Tsai | G06F 3/0416 |
| 2017/0192508 | A1 | 7/2017 | Lim | |
| 2017/0344146 | A1 * | 11/2017 | Sun | G06F 3/0412 |

(Continued)

*Primary Examiner* — Tony O Davis
(74) *Attorney, Agent, or Firm* — The Noblitt Group, PLLC; Hettie L. Haines

(57) ABSTRACT

Various embodiments of the present technology may provide methods and apparatus for a touch sensor. The touch sensor may include a plurality of horizontally-positioned electrode chains and a plurality of vertically-positioned electrode chains overlapping the plurality of horizontally-positioned electrode chains. Each electrode chain from the plurality of horizontally-positioned electrode chains and the plurality of vertically-positioned electrode chains may operate as a drive electrode and a reception electrode.

20 Claims, 11 Drawing Sheets

(56) References Cited

U.S. PATENT DOCUMENTS

2018/0196543 A1\*  7/2018  Otagaki .................. G06F 3/044
2018/0314372 A1\* 11/2018  Lee ....................... G09G 3/3208
2018/0323240 A1\* 11/2018  Won ..................... H01L 51/5206

\* cited by examiner

METHODS AND APPARATUS FOR A CAPACITIVE TOUCH SENSOR

This application claims the benefit of U.S. Provisional Patent Application No. 62/831,832, filed on Apr. 10, 2019, the entire contents of which is incorporated herein by reference.

BACKGROUND OF THE TECHNOLOGY

Electronic devices with a touch sensing surface may utilize various capacitive sensing devices to allow a user to make selections and move objects by moving their finger (or stylus) relative to a capacitive sensing element. Mutual capacitance touch sensors not only have the ability to detect touch events on the sensing surface, but also have the ability to detect proximity events, in which the finger is not touching the sensing surface, but is in close proximity to the sensing surface. The mutual capacitive touch sensor operates by measuring the capacitance of the sensor, and detecting a change in capacitance, which indicates a direct touch or presence of a conductive object (e.g., a finger, hand, foot, or other object). When the conductive object comes into contact or close proximity with the capacitive sensor, the capacitance changes and the conductive object is detected. An electrical circuit may be used to measure the change in capacitance and may utilize the change in capacitance to determine the location, pressure, direction, gestures, speed and acceleration of the object as it is approaches, makes contact with, and/or moves across the touch surface of the sensor.

SUMMARY OF THE INVENTION

Various embodiments of the present technology may provide methods and apparatus for a capacitive touch sensor. The touch sensor may include a plurality of horizontally-positioned electrode chains and a plurality of vertically-positioned electrode chains overlapping the plurality of horizontally-positioned electrode chains. Each electrode chain from the plurality of horizontally-positioned electrode chains and the plurality of vertically-positioned electrode chains may operate as a drive electrode and a reception electrode.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and circuit diagrams. Such functional blocks and circuit diagrams may be realized by any number of components configured to perform the specified functions and achieve the various results. For example, the present technology may employ various types of analog-to-digital converters, capacitors, amplifiers, power sources, switches, and the like, which may carry out a variety of functions. The methods and apparatus for a capacitive touch sensor according to various aspects of the present technology may operate in conjunction with any electronic device and/or device input application, such as a cellular phone, an audio device, a gaming device, a television, a personal computer, and the like.

Figure 1:
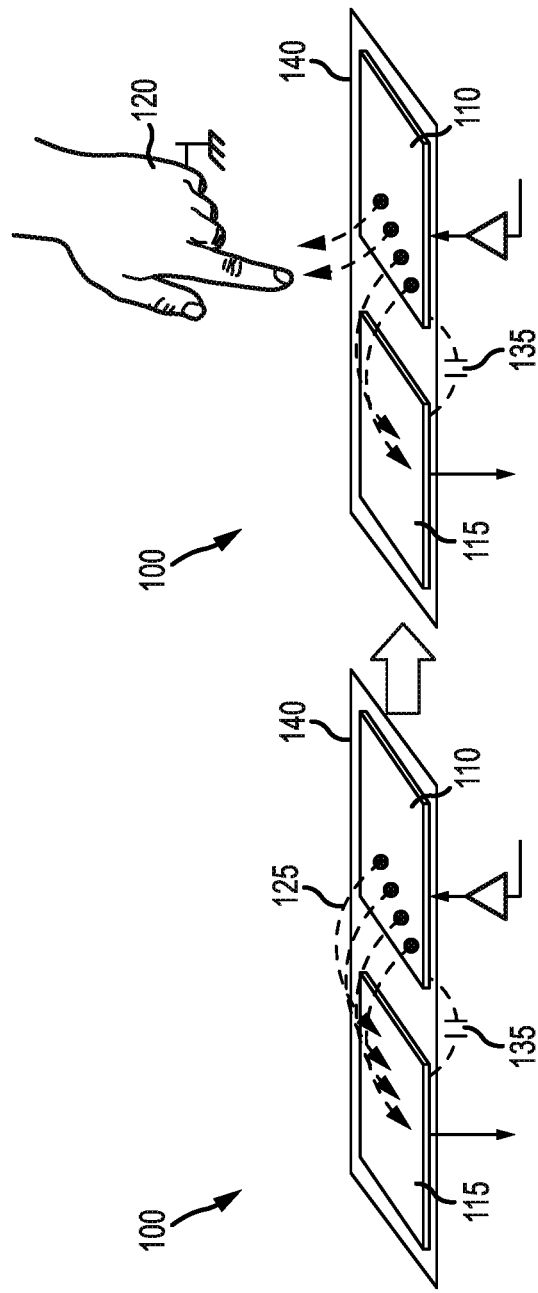
FIGS. 1A and 1B representatively illustrate a mutual capacitance touch sensor in accordance with an exemplary embodiment of the present technology.

Referring to FIGS. 1A-1B, mutual capacitance sensing may be used to detect an object by measuring a change in a capacitance between a drive electrode 110 (i.e., a transmission electrode) and a reception electrode 115 (i.e, an input electrode). For example, in operation, the drive electrode 110 and the reception electrode 115 form an electric field 125 when a power source, which pulses between two voltage levels, provides a drive signal to the drive electrode 110.

Mutual capacitance touch sensing may be used to detect an object 120 within the electric field 125 (i.e., proximity sensing). For example, when the object 120, such as a hand, a fingertip, a pen point or like, enters the electric field 125, the electric field 125, which is generated at a surface of the electrodes 110, 115, is disrupted and results in a change in capacitance between the drive and reception electrodes 110, 115. The change in capacitance may indicate the proximity of the object 120 from the surface of the electrodes 110, 115. As such, the object 120 may not need to physically touch the electrodes 110, 115 to effect a change in the capacitance.

Alternatively, or in addition to proximity sensing, mutual capacitance touch sensing may be used as a direct-touch sensor, wherein direct contact with the electrodes 110, 115 may be detected based on the change in capacitance. Proximate and direct touching may be referred to as a touch event.

In general, as the object 120 approaches, such as when a person's finger gets close to the electrodes 110, 115, some of the electric field 125 is absorbed by the object 120, decreasing the amount of energy, and thus, reducing the capacitance. As the object 120 gets closer to the surface of the electrodes 110, 115, more of the electric field 125 is absorbed by the object 120 and the capacitance may continue to decrease. An output voltage and corresponding digital output will change according to the change in capacitance. For example, a decrease in capacitance may cause the output voltage and the corresponding digital output to increase. As the digital output changes according to the amount of energy detected, it may be possible to quantify or otherwise estimate the distance between the object 120 and the surface of the electrodes 110, 115.

Figure 2:
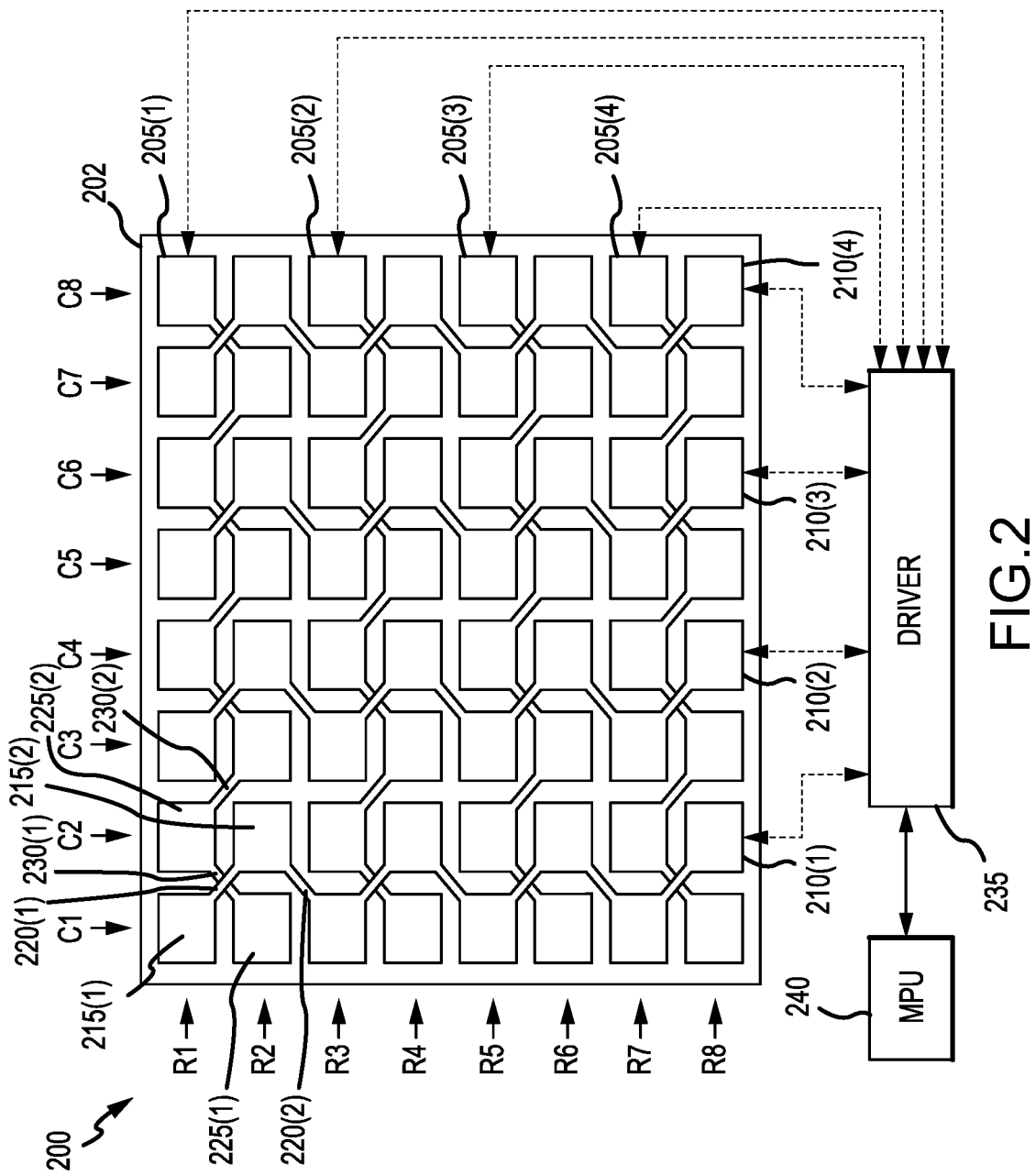
FIG. 2 representatively illustrates a capacitive touch sensor system in accordance with an exemplary embodiment of the present technology.
Figure 3:
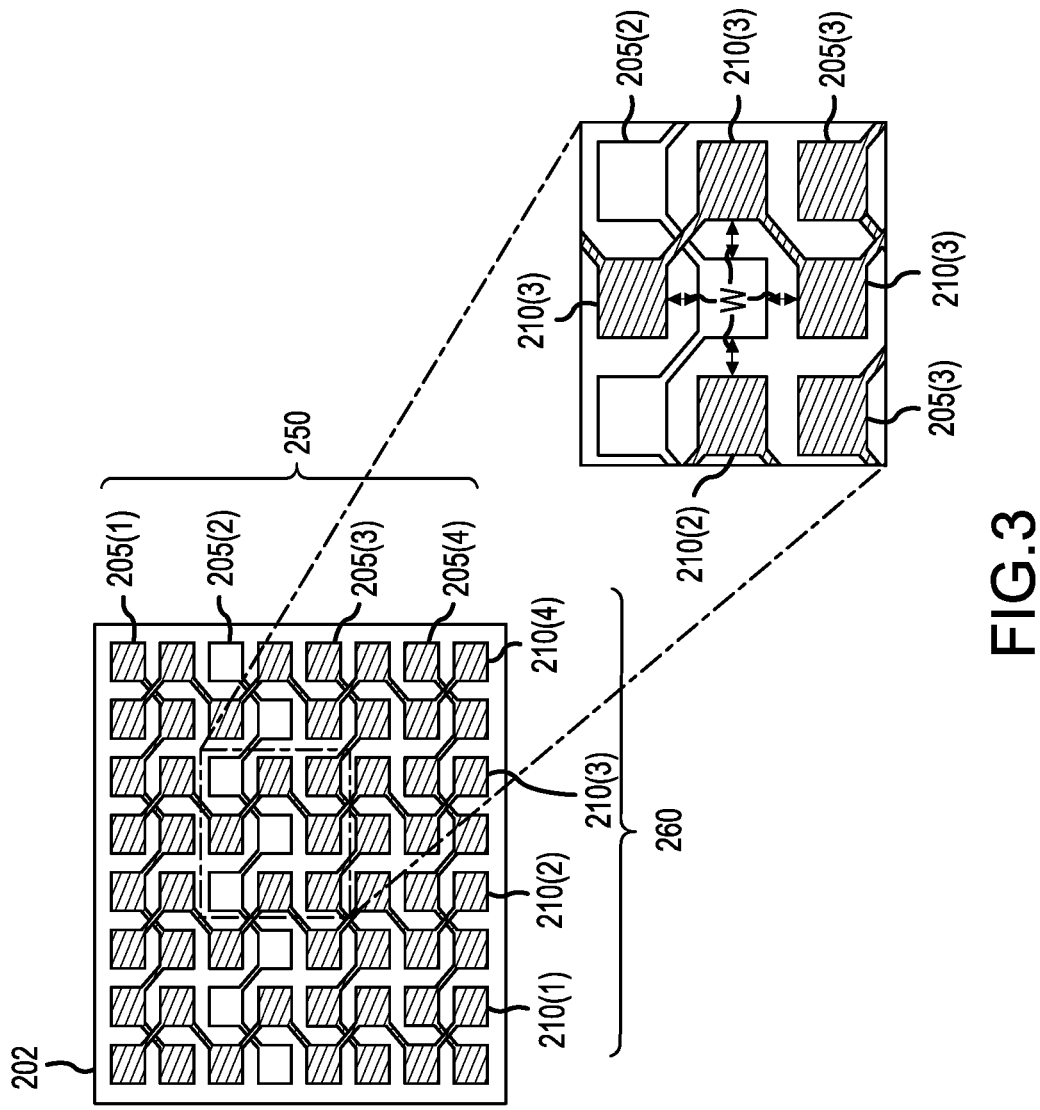
FIG. 3 representatively illustrates a capacitive touch sensor array in accordance with an exemplary embodiment of the present technology.
Figure 4B:
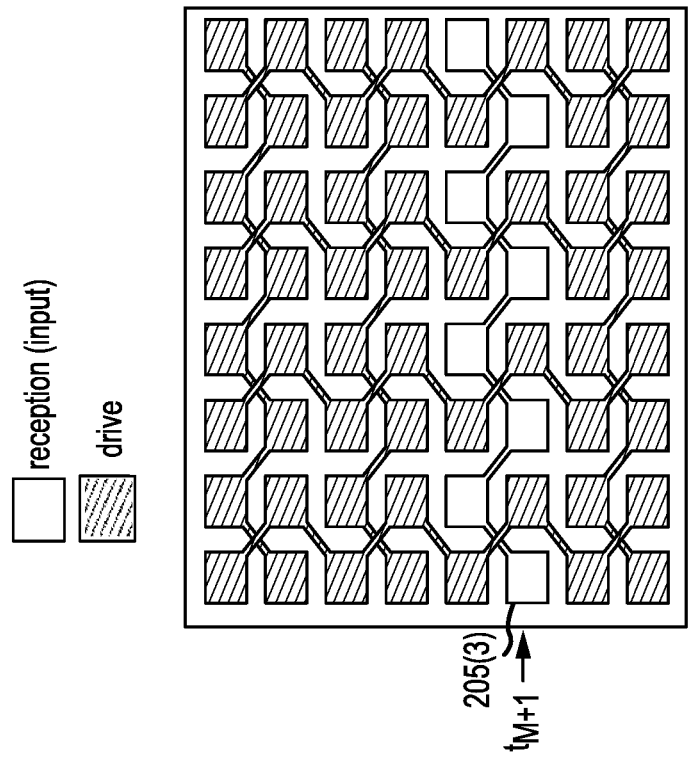
FIGS. 4A-4B representatively illustrates an input sequence of horizontally-positioned electrode chains in accordance with an exemplary embodiment of the present technology.
Figure 4A:
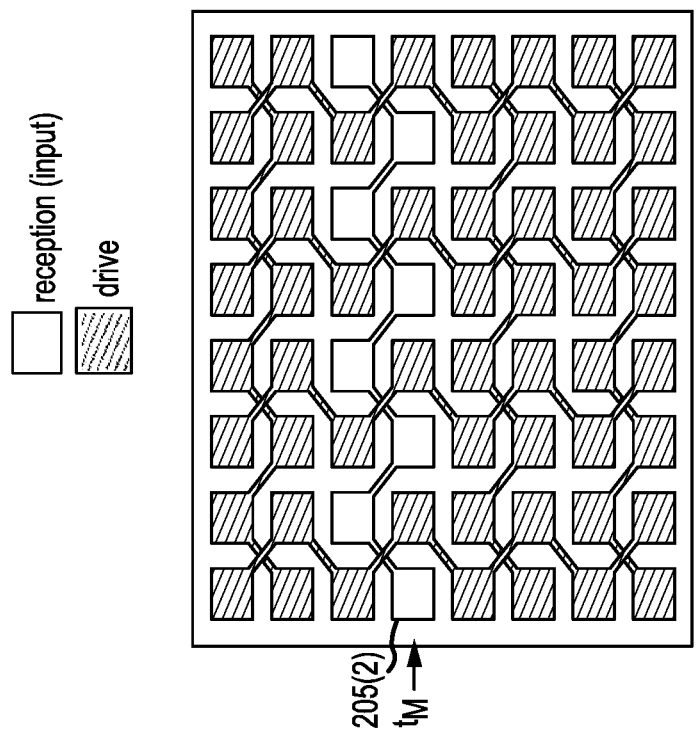
Figure 5B:
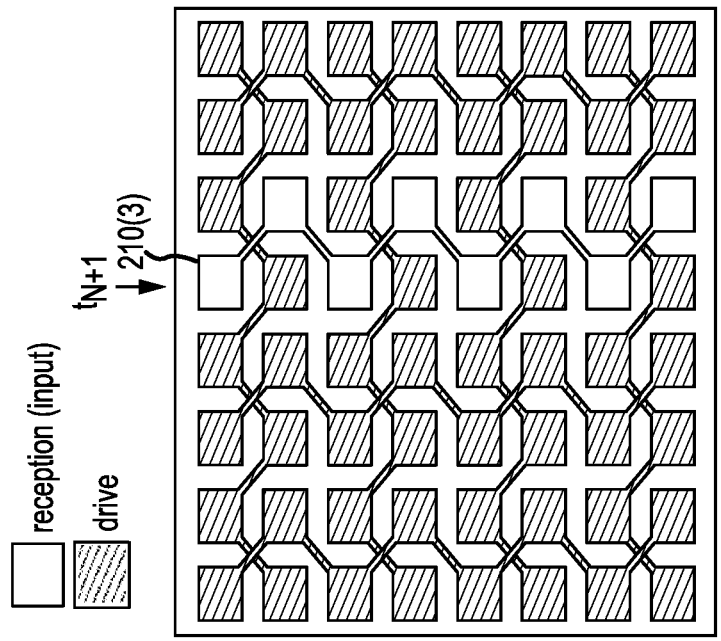
FIGS. 5A-5B representatively illustrates an input sequence of vertically-positioned electrode chains in accordance with an exemplary embodiment of the present technology.
Figure 5A:
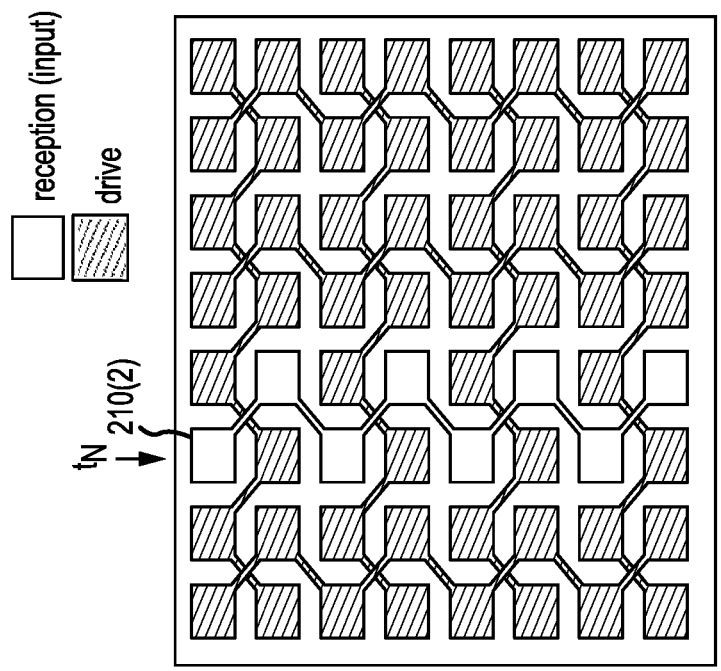

Referring to FIGS. 2 and 3, in accordance with an exemplary embodiment of the present technology, a touch sensor system 100 may be configured to operate according to the principles of mutual capacitance sensing described above. The touch sensor system 100 may comprise a touch sensor array 202, a driver circuit 235, and a microprocessor unit (MPU) 240. The touch sensor system 100 may form various input devices, such as buttons, switches, dials, sliders, keys or keypads, navigation pads, touch pad, and may be integrated in an electronic device, such as a cellular phone, personal computer, and the like.

In various embodiments, the touch sensor system 100 may be configured to detect single inputs, multiple inputs, and gestures, such as rotating, scrolling, flicking, scaling, dragging, and the like. The touch sensor system 100 may comprise multiple electrodes arranged to form multiple mutual capacitance-type sensors.

In various embodiments, the touch sensor array 202 may be configured as a mutual capacitance touch sensor. For example, the touch sensor array 202 may comprise a plurality of electrodes suitably configured to form an electric field. For example, the plurality of electrodes may comprise a first set of electrode chains 250 comprising a plurality of first individual electrode chains, such as individual electrode chains 205(1):205(4), arranged along a first direction (e.g., horizontally). The plurality of electrodes may further comprise a second set of electrode chains 260 comprising a plurality of second individual electrode chains, such as individual electrode chains 210(1): 210(4) arranged along a second direction (e.g., vertically). In an exemplary embodiment, the first set of electrode chains 250 are perpendicular to the second set of electrode chains 260. Each electrode chain may be formed using a conductive material, such as metal.

Figure 9:
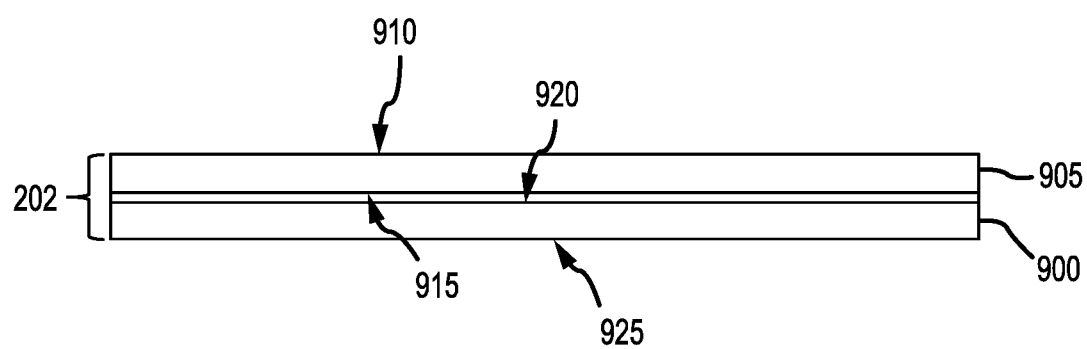
FIG. 9 is a cross-sectional view of the touch sensor array in accordance with an exemplary embodiment of the present technology.
Figure 10:
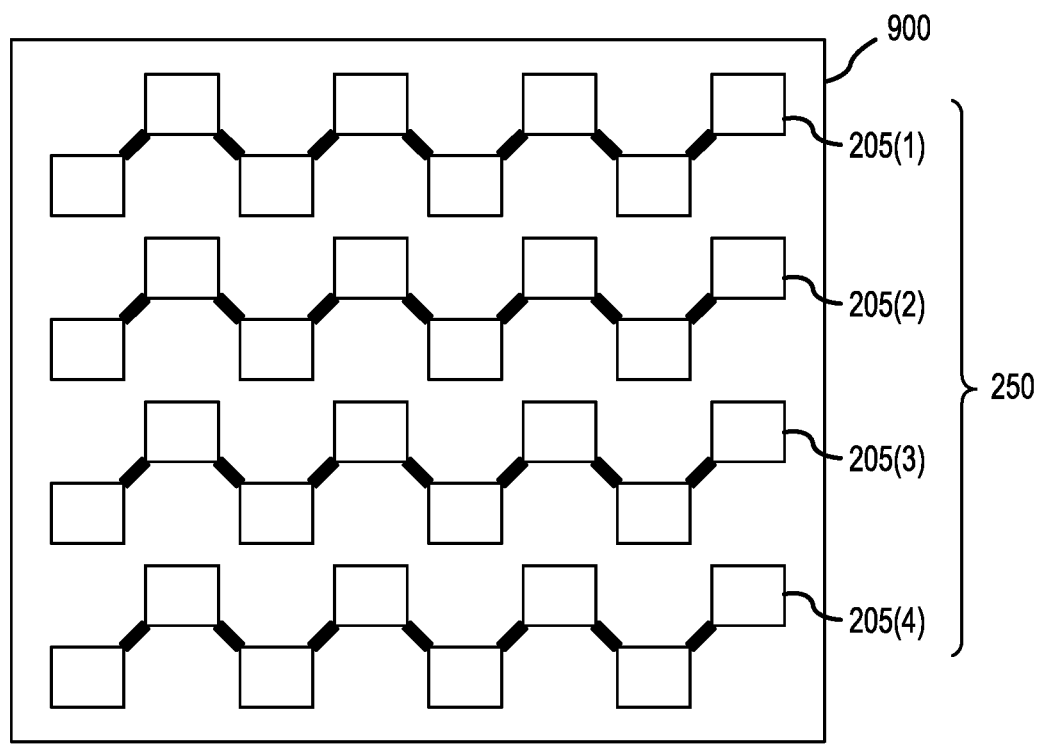
FIG. 10 representatively illustrates the horizontally-positioned electrode chains formed on a first substrate in accordance with an exemplary embodiment of the present technology.
Figure 11:
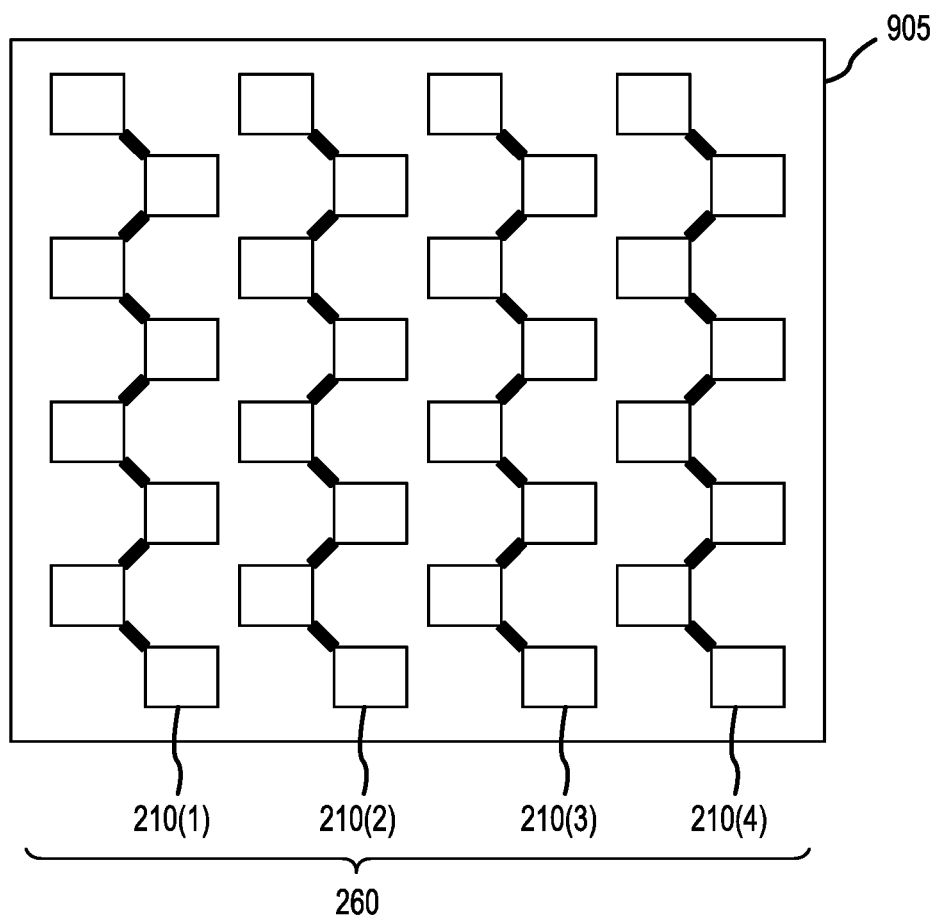
FIG. 11 representatively illustrates the vertically-positioned electrode chains formed on a second substrate in accordance with an exemplary embodiment of the present technology.

Referring to FIGS. 9, 10, and 11, the touch sensor array 202 may be formed on a substrate with one or more substrate layers. For example, the first set of electrode chains 250 may be formed on a first substrate layer 900 and the second set of electrode chains 260 may be formed on a second substrate layer 905. The first substrate layer 900 may comprise a first major surface 925 and a second major surface 920 opposite that of the first major surface 925. The second substrate layer 905 may comprise a first major surface 910 and a second major surface 915 opposite that of the first major surface 910. The first and second substrate layers 900, 905 may be bonded together, such that the second major surface 920 of the first substrate layer 900 is directly adjacent to the second major surface 915 of the second substrate layer 905. Accordingly, various elements of each substrate layer may overlap but are electrically insulated from each other. The substrate may comprise any suitable material for depositing, forming, and/or inscribing a circuit, such as glass coated with indium tin oxide, a PET (polyethylene terephthalate) substrate, a polymer film, a PCB substrate, and the like.

Referring to FIG. 2, the electrode chains 205(1):205(4), 210(1):210(4) may be arranged in a pattern that results in symmetry across the entire touch sensor array 202. According to an exemplary embodiment, the plurality of first individual electrode chains 205(1):205(4) may be arranged symmetrically across the touch sensor array 202. For example, the plurality of first individual electrode chains 205(1):205(4) may be evenly-spaced with respect to each other along the second direction (e.g., evenly-spaced from top to bottom on the touch sensor array 202). Similarly, the plurality of second individual electrode chains 210(1):210(4) may be arranged symmetrically across the touch sensor array 202. For example, the electrode chains 210(1):210(4) may be evenly-spaced with respect to each other along the first direction (e.g., evenly-spaced from side to side on the touch sensor array 202).

Each electrode chain 205 from the first set of electrode chains 250 may comprise a plurality of electrode pads 225, such as a first electrode pad 225(1) and a second electrode pad 225(2). In addition, each electrode chain 205 may further comprise a plurality of connectors 230, such as a first connector 230(1) and a second connector 230(2), to electrically connect adjacent electrode pads 225. For example, the first connector 230(1) may connect the first electrode pad 225(1) to the second electrode pad 225(2) and the second connector 230(2) may connect the second electrode pad 225(2) to a next-adjacent electrode pad, and so on.

Similarly, each electrode chain 210 from the second set of electrode chains 260 may comprise a plurality of electrode pads 215, such as a first electrode pad 215(1) and a second electrode pad 215(2). In addition, each electrode chain 210 may further comprise a plurality of connectors 220, such as a first connector 220(1) and a second connector 220(2), to electrically connect adjacent electrode pads 215. For example, the first connector 220(1) may connect the first electrode pad 215(1) to the second electrode pad 215(2) and the second connector 220(2) may connect the second electrode pad 215(2) to a next-adjacent electrode pad, and so on.

According to an exemplary embodiment, the connectors 220 of the second set of electrode chains 260 overlaps, but is electrically insulated from, the connectors 230 of the first set of electrode chains 250.

Each set of electrodes 250, 260 may comprise any number of electrode chains, and each electrode chain (e.g., electrode chains 205, 210) may comprise any number of electrode pads and connectors. The number of electrode chains, electrode pads, and connectors may be based on a desired sensitivity, a desired total area for the array 202, the particular application, and the like.

The electrode pads 215, 225 and connectors 220, 230 may be arranged in the substrate in any suitable manner. In an exemplary embodiment, the electrode pads 215, 225 from each electrode chain may be evenly-spaced with respect to each other and may be arranged in an alternating, diagonal pattern, connected by the connectors. In other words, the electrode chains are arranged in a zigzag pattern. For example, the each electrode chain 205 from the first set of electrode chains 250 are arranged in the zigzag pattern from a first edge of the touch sensor array 202 to an opposing second edge of the touch sensor array 202. Similarly, each electrode chain 210 from the second set of electrode chains 260 may be positioned substantially perpendicular to the first set electrode chains 250 and arranged in a zigzag pattern extending from a third edge of the touch sensor array 202 to an opposing fourth edge of the touch sensor array 202.

Figure 8:
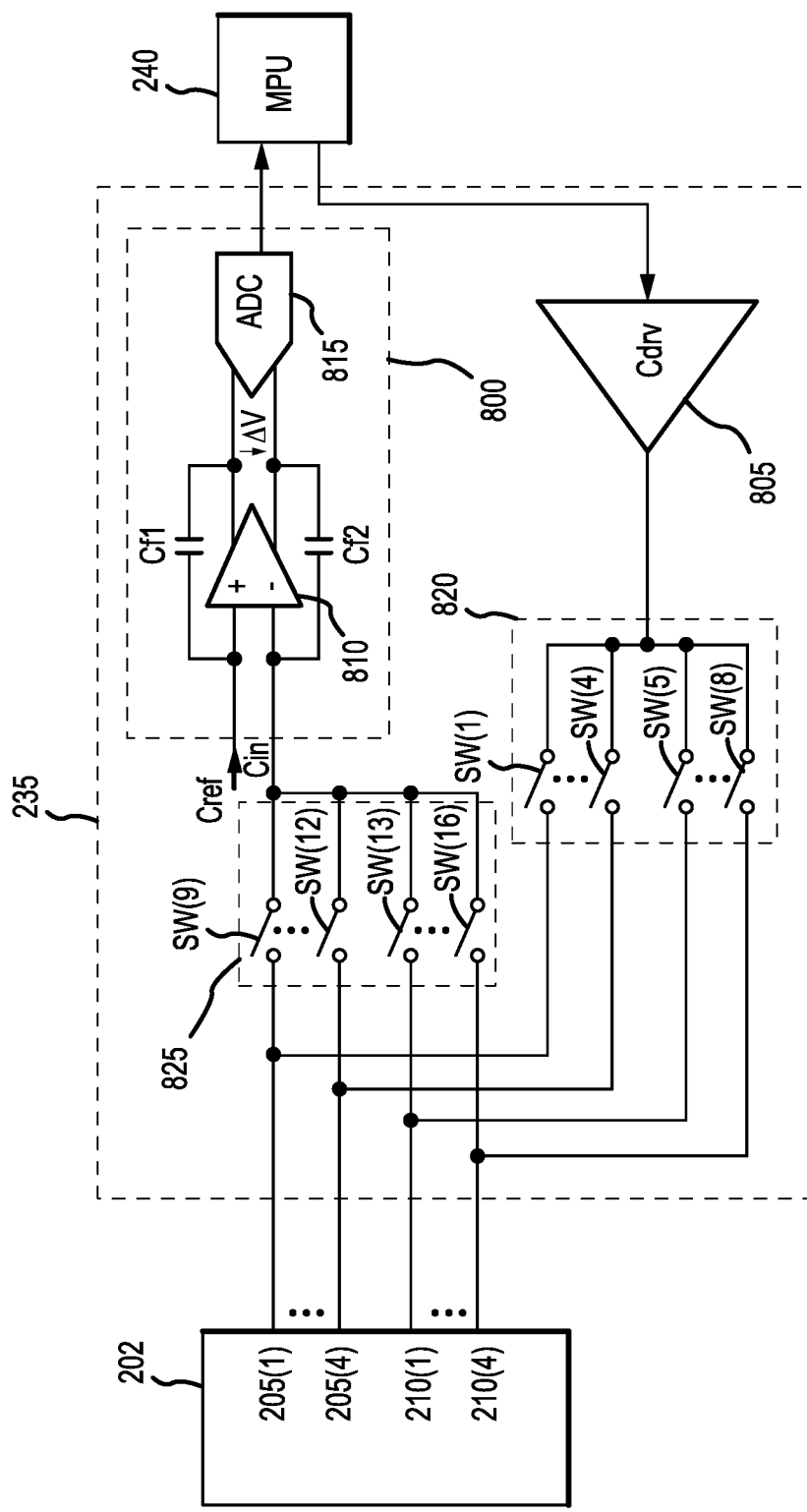
FIG. 8 is a circuit diagram of a driver circuit in accordance with an exemplary embodiment of the present technology.

According to an exemplary embodiment, and referring to FIGS. 2 and 8, each electrode chain 205, 210 may be configured to operate as a reception electrode and a drive electrode. For example, each electrode chain 205, 210 may be configured to receive a drive signal Cdrv and thereby operate as the drive electrode. In addition, the capacitance of each electrode chain 205, 210 may be measured and thereby operate as the reception electrode.

In various embodiments, and as result of bonding the first and second substrate layers 900, 905 (FIG. 9) together, the touch sensor array 202 may be arranged as an m×n array comprising n columns (e.g., columns C1:C8) and m rows (e.g., rows R1:R8), where n and m are whole numbers. For example, electrode pads from multiple electrode chains may form a first column C1 and electrode pads from multiple electrode chains may form a first row R1, etc. Accordingly, the location of each electrode pad within the touch sensor array 202 may be described according to a particular coordinate comprising a row number and a column number.

According to an exemplary embodiment, and referring to FIG. 3, spacing between a single electrode pad and neighboring electrode pads may be equal. For example, for any electrode pad (a subject electrode pad), the electrode pads that are located directly-above the subject electrode pad, directly-below the subject electrode pad, directly-to-the-left of the subject electrode pad, and directly-to-the-right of the subject electrode pad are all spaced from the subject electrode pad by a distance W. In other words, all electrode pads are evenly-spaced with at least 4 directly-adjacent electrode pads.

Figure 6:
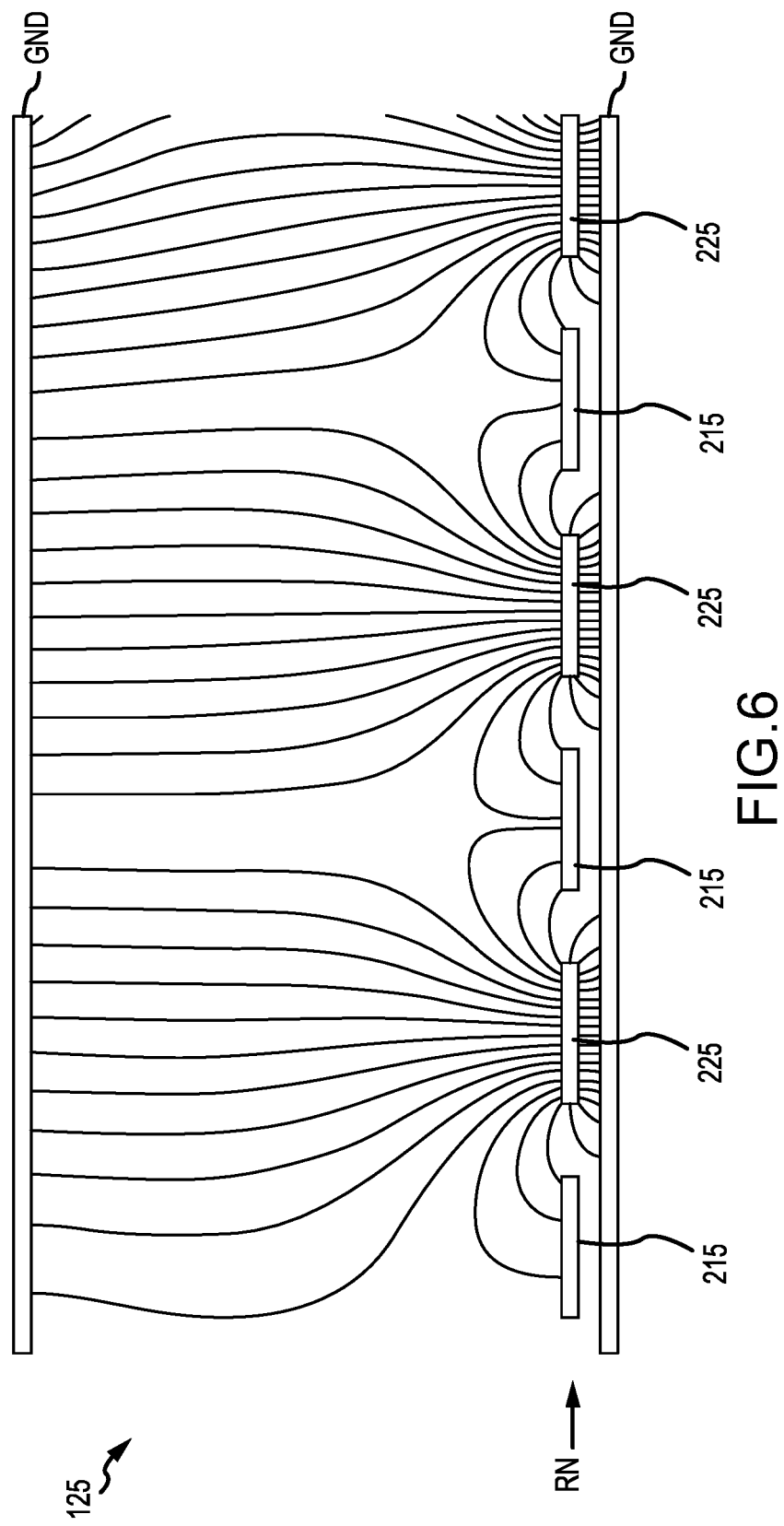
FIG. 6 representatively illustrates electric field lines between adjacent electrode pads in accordance with an exemplary embodiment of the present technology.
Figure 7:
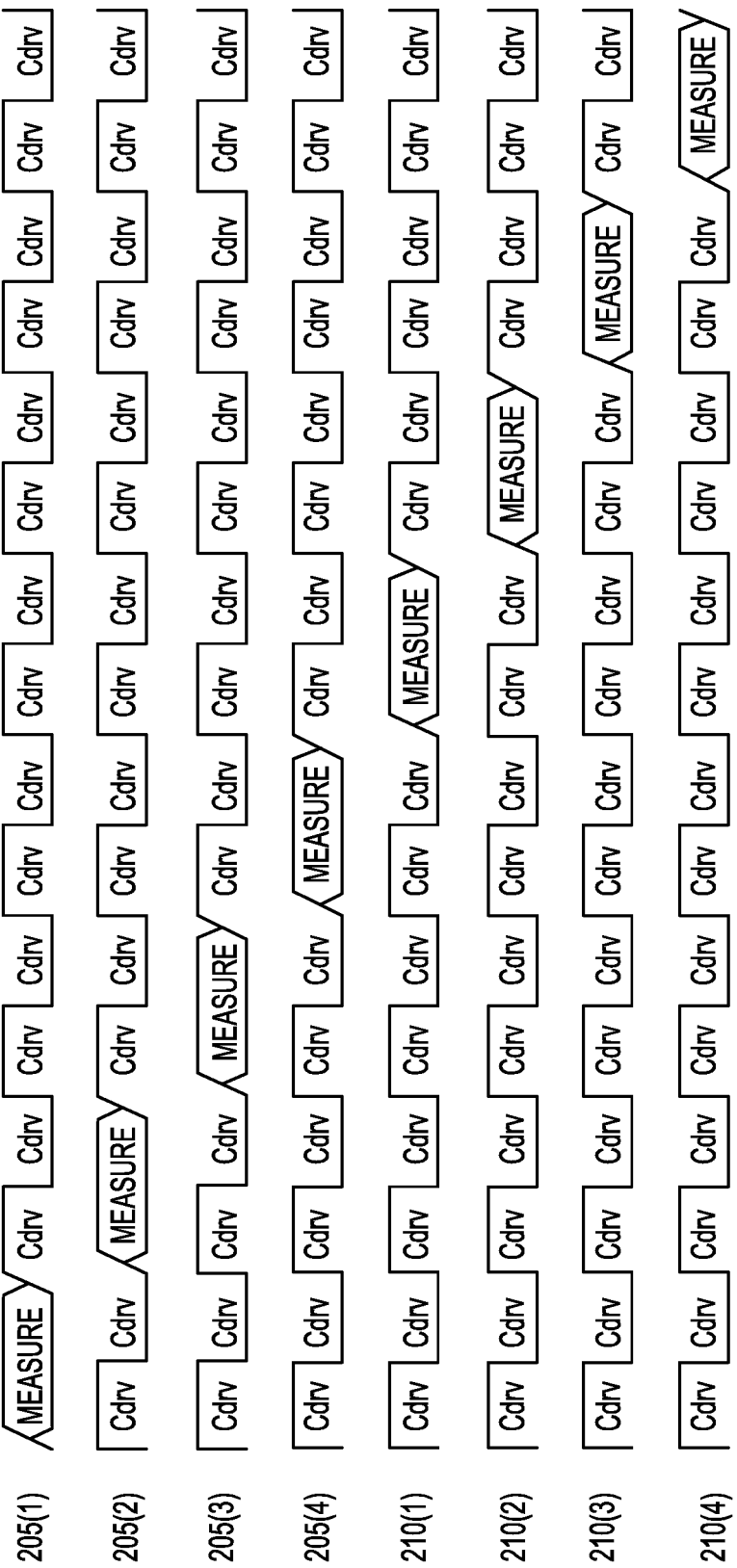
FIG. 7 representatively illustrates an activation sequence of the touch sensor array in accordance with an exemplary embodiment of the present technology.

This arrangement may provide a symmetrical electric field 125 between directly-adjacent electrode pads. For example, and referring to FIG. 6, in operation, when a particular electrode chain is operating as the reception electrode, alternating electrode pads in an active row RN will operate as the reception electrodes and the electrode pads that are between and directly-adjacent to the reception electrodes will operate as the drive electrodes. For example in FIG. 6, the electrode pads 215 are operating as the drive electrodes and the electrode pads 225 are operating as the reception electrodes.

The electrode pads 215, 225 may comprise any shape and size. For example, each electrode pad 215, 225 may be a rectangular shape or a square shape. In addition, the connectors 220, 230 may comprise any shape and size. For example, the connectors 220, 230 may be a straight, line-like shape connected to the corners of two diagonally-spaced electrode pads.

In various embodiments, and referring to FIGS. 2 and 8, the driver circuit 235 may generate and apply the drive signal Cdrv to one or more electrode chains (e.g., electrode chains 205, 210). For example, the driver circuit 235 may comprise a driver 805 configured to generate the drive signal Cdrv. The driver circuit 235 may be connected to and respond to various signals from the MPU 240. For example, the driver 805 may be connected to the MPU 140 and receive a control signal that controls a voltage of the drive signal Cdrv. For example, the control signal may indicate a low-voltage (e.g., zero volts) drive signal Cdrv or a high-voltage (e.g., greater than zero volts) drive signal Cdrv.

The driver circuit 235 may further comprise a first plurality of switches 820, such as switches SW(1):SW(8), configured to selectively apply the drive signal Cdrv to one or more electrode chains 205, 210. The first plurality of switches 820 may comprise one switch for each electrode chain in the touch sensor array 202. For example, if the touch sensor array 202 comprises 8 electrode chains, then the first plurality of switches 820 comprises 8 switches. Each switch from the first plurality of switches 820 may be in communication with the microprocessor 240 and respond to a respective switch signal from the microprocessor 240. For example, each switch from the first plurality of switches 820 is either ON or OFF based on the switch signal.

In various embodiments, the driver circuit 235 may be further configured to detect the object 120 by measuring and/or detecting a change in capacitance formed between one or more electrode chains. For example, the driver circuit 235 may comprise a conversion circuit 800 to convert a capacitance value to a digital output. In an exemplary embodiment, the conversion circuit 800 may comprise an amplifier, such as a fully differential amplifier 810, and an analog-to-digital converter (ADC) 815.

The fully differential amplifier 810 may receive a first input from a reference capacitor having a reference capacitance Cref and a second input from the touch sensor array 202, wherein the touch sensor array 202 has a sensing capacitance Cin, corresponding to the electrode chain that is operating as the reception electrode. The sensing capacitance Cin is equal to the reference capacitance Cref when there are no objects absorbing the electric field 125, however, the sensing capacitance Cin is equal to the reference capacitance minus the change in the capacitance (Cin=Cref−ΔC, also ΔC=Cref−Cin) when the object enters the electric field 125. The differential amplifier 810 may be configured to convert the change in capacitance (ΔC) to a change in voltage (ΔV).

The fully differential amplifier 810 may further comprise a feedback capacitor to reduce noise in the signals. In an exemplary embodiment, the fully differential amplifier 810 comprises a first feedback capacitor Cf1 coupled between an output terminal and the non-inverting terminal (+) of the differential amplifier 200, and a second feedback capacitor Cf2 coupled between the output terminal and the inverting terminal (−) of the fully differential amplifier 810. According to an exemplary embodiment, the fully differential amplifier 810 receives the reference capacitance Cref at the non-inverting terminal (+) and receives the input capacitance Cin at the inverting terminal (−).

The ADC 815 may be configured to convert the change in voltage to a digital output. For example, the ADC 815 may be connected to an output terminal of the fully differential amplifier 810. The ADC 815 may comprise any suitable ADC architecture.

According to an exemplary embodiment, the driver circuit 235 may further comprise a second plurality of switches 825, such as a switches SW(9):SW(16), to selectivity connect the touch sensor array 202 to the conversion circuit 800. The second plurality of switches 825 may comprise one switch for each electrode chain in the touch sensor array 202. For example, if the touch sensor array 202 comprises 8 electrode chains, then the second plurality of switches 825 comprises 8 switches. Each switch may be in communication with the microprocessor 240 and respond to a switch signal from the microprocessor 240. For example, each switch from the second plurality of switches 825 is either ON or OFF based on the switch signal.

In various embodiments, the touch sensor system 100 may detect when the digital output reaches and/or exceeds a predetermined threshold value according to the change the capacitance (ΔC). The touch sensor system 100 may respond once the digital output reaches or exceeds the predetermined threshold value. For example, the touch sensor system 100 may transmit a control signal to an output circuit (not shown) to switch states between ON and OFF when the digital output reaches or exceeds the predetermined threshold value, which may indicate some input selection of an electronic device, such as a cellular phone.

In various embodiments, the microprocessor 240 may be configured to compare the digital output from the ADC 815 to the predetermined threshold and utilize the digital output in conjunction with the drive signal Cdrv to determine if a touch event has occurred. For example, the microprocessor 240 may monitor changes in capacitance by receiving an input capacitance from each electrode chain, row-by-row (e.g., electrode chains 205(1):205(4)) and column-by-column (e.g., electrode chains 210(1):210(4)). Based on the values of the digital output for each electrode chain, the microprocessor 240 may determine the coordinate of the touch. For example, if a first electrode chain 205(1) is activated (e.g., has a digital output value greater than the threshold value) and later, a third electrode chain 210(3) is also activated, then the microprocessor 240 may determine that the touch event occurred at row 1, column 6 (R1, C6).

The microprocessor 240 may be configured to operate each electrode chain as a reception electrode or a drive electrode at any given time. For example, the microprocessor 240 may activate the drive signal Cdrv for all but one electrode chain via the first plurality of switches 820. The microprocessor 240 may be further configured to measure the capacitance of the one electrode chain that is not receiving the drive signal Cdrv (i.e., the input capacitance of the reception electrode) via operation of the second plurality of switches 825. The microprocessor 240 may operate the first and second plurality of switches according to a clock signal (not shown), such that the first and second plurality of switches are synchronized. The microprocessor 240 may also pulse the drive signal Cdrv according to the clock signal.

In operation, and referring to FIGS. 4A-4B, 5A-5B, 7, and 8, the touch sensor system 100 detects the object 120 entering the electric field 125 and determines whether a touch event occurred by measuring changes in the capacitance of the capacitor formed by the reception electrode and the drive electrode.

According to an exemplary operation, the touch sensor system 100 operates one electrode chain from the touch sensor array 202 as the reception electrode and all remaining electrode chains as the drive electrodes. The microprocessor 240 and driver circuit 235 may operate in conjunction with each other to selectively measure the input capacitance Cin of one electrode chain from the array 202 via a switch from the second plurality of switches 825 and apply the drive signal Cdrv to the remaining electrode chains via the switches from the first plurality of switches 820.

According to an exemplary embodiment, during a first clock cycle, the touch sensor system 100 may operate the first electrode chain 205(1) from the first set of electrode chains 250 as the reception electrode and operate all other electrode chains (e.g., 205(2):205(4) and 210(1):210(4)) as the drive electrodes. The touch sensor system 100 may measure the capacitance formed between the first electrode chain 205(1) and the adjacent drive electrode chains. During a second clock cycle, the touch sensor system 100 may operate the second electrode chain 205(2) as the reception electrode and operate other electrode chains (e.g., 205(1), 205(3):205(4) and 210(1):210(4)) as the drive electrodes. The touch sensor system 100 may measure the capacitance formed between the second electrode chain 205(2) and the adjacent drive electrode chains. This pattern may be repeated until all electrode chains in the first set of electrode chains 250 have been operated as the reception electrode.

The touch sensor system 100 may then operate the first electrode chain 210(1) from the second set of electrode chains 260 as the reception electrode and operate all other electrode chains (e.g., 205(1):205(4) and 210(2):210(4)) as the drive electrodes. The touch sensor system 100 may measure the capacitance formed between the first electrode chain 205(1) and the adjacent drive electrode chains. During a second clock cycle, the touch sensor system 100 may operate the second electrode chain 210(2) as the reception electrode and operate other electrode chains (e.g., 205(1):205(4), 210(1) and 210(3):210(4)) as the drive electrodes. The touch sensor system 100 may measure the capacitance formed between the second electrode chain 210(2) and the adjacent drive electrode chains. This pattern may be repeated until all electrode chains in the second set of electrode chains 260 have been operated as the reception electrode.

According to an exemplary operation, the touch sensor system 100 operates according to a first phase and a second phase. In the first phase, the electrode chains in the first set of electrode chains 250 are sequentially operated as reception electrodes and measured from top to bottom. For example, and referring to FIGS. 4A-4B, at time $T_M$, the second electrode chain 205(2) is the reception electrode (shown in white) and generates an input capacitance Cin, while all other electrode chains operate as drive electrodes (shown with lined shading). This may be achieved by connecting the second electrode chain 205(2) to the conversion circuit 800 via a switch from the second plurality of switches 825 and connecting all other electrode chains to the drive signal Cdrv via the first plurality of switches 820. Accordingly, at time $T_M$, the second electrode chain 205(2) is providing the input signal (Cin) and measured by the conversion circuit 800.

At time $T_{M+1}$, the third electrode chain 205(3) is the reception electrode (shown in white) and generates the input capacitance Cin, while all other electrode chains operate as drive electrodes (shown with lined shading). This may be achieved by connecting the third electrode chain 205(3) to the conversion circuit 800 via a switch from the second plurality of switches 825 and connecting all other electrode chains to the drive signal Cdrv via the first plurality of switches 820. Accordingly, at time $T_{M+1}$, the third electrode chain 205(3) is providing the input signal (Cin) and measured by the conversion circuit 800.

In the second phase, the electrode chains in the second set of electrode chains 260 are sequentially operated as reception electrodes and measured from left to right. For example, and referring to FIGS. 5A-5B, at time $T_N$, the second electrode chain 210(2) is the reception electrode (shown in white) and generates an input capacitance Cin, while all other electrode chains operate as drive electrodes (shown with lined shading). This may be achieved by connecting the second electrode chain 210(2) to the conversion circuit 800 via a switch from the second plurality of switches 825 and connecting all other electrode chains to the drive signal Cdrv via the first plurality of switches 820. Accordingly, at time $T_N$, the second electrode chain 210(2) is providing the input signal (Cin) and measured by the conversion circuit 800.

At time $T_{N+1}$, the third electrode chain 210(3) is the reception electrode (shown in white) and generates the input capacitance Cin, while all other electrode chains operate as drive electrodes (shown with lined shading). This may be achieved by connecting the third electrode chain 210(3) to the conversion circuit 800 via a switch from the second plurality of switches 825 and connecting all other electrode chains to the drive signal Cdrv via the first plurality of switches 820. Accordingly, at time $T_{N+1}$, the third electrode chain 210(3) is providing the input signal (Cin) and measured by the conversion circuit 800.

Alternatively, other measuring sequences for the input capacitance may be applied, such as from right to left and/or bottom to top, or any other desired sequence.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. A mutual capacitance touch sensor, comprising:
   a plurality of horizontally-positioned electrode chains, wherein each electrode chain from the plurality of horizontally-positioned electrode chains:
      comprises a first plurality of electrically-connected electrode pads; and
      is configured to operate as a drive electrode and a transmission electrode; and
   a plurality of vertically-positioned electrode chains partially overlapping the plurality of horizontally-positioned electrode chains, wherein each electrode chain from the plurality of vertically-positioned electrode chains:
      comprises a second plurality of electrically-connected electrode pads; and
      is configured to operate as the drive electrode and the transmission electrode.

2. The mutual capacitance touch sensor according to claim 1, wherein the first plurality of electrode pads are electrically connected to each other via a first plurality of connectors, wherein a first electrode pad from the first plurality of electrode pads is connected to a second electrode pad from the first plurality of electrode pads via a first connector.

3. The mutual capacitance touch sensor according to claim 2, wherein the second plurality of electrode pads are electrically connected to each other via a second plurality of connectors, wherein a third electrode pad from the second plurality of electrode pads is connected to a fourth electrode pad from the second plurality of electrode pads via a second connector.

4. The mutual capacitance touch sensor according to claim 3, wherein:
   the second connector overlaps the first connector; and
   the first, second, third, and fourth electrodes pads are non-overlapping.

5. The mutual capacitance touch sensor according to claim 1, wherein the first plurality of electrode pads are:
   evenly-spaced with respect to each other; and
   arranged in an alternating diagonal pattern.

6. The mutual capacitance touch sensor according to claim 1, wherein the second plurality of electrode pads are:
   evenly-spaced with respect to each other; and
   arranged in an alternating diagonal pattern.

7. The mutual capacitance touch sensor according to claim 1, wherein:
   the plurality of horizontally-positioned electrode chains are formed in a first substrate layer; and
   the plurality of vertically-positioned electrode chains are formed in a second substrate layer; and
   the first and second substrate layers are bonded together.

8. The mutual capacitance touch sensor according to claim 1, wherein:
   at least one electrode pad, from the plurality of horizontally-positioned electrodes chains, is evenly-spaced between at least four directly-adjacent electrode pads; and
   at least one electrode pad, from the plurality of vertically-positioned electrode chains, is evenly-spaced between at least four directly-adjacent electrode pads.

9. The mutual capacitance touch sensor according to claim 8, wherein the directly-adjacent electrode pads comprise a directly-above electrode pad, a directly-below electrode pad, a directly-to-the-right electrode pad, and a directly-to-the-left electrode pad.

10. A method for operating a mutual capacitance touch sensor, comprising:
   activating a first phase comprising:
      operating a first electrode chain from a plurality of horizontally-positioned electrode chains as a reception electrode and operating all remaining electrode chains from the plurality of horizontally-positioned electrode chains as a drive electrode;
      operating a plurality of vertically-positioned electrode chains as the drive electrode; and
      forming a first capacitance between the first electrode chain and directly-adjacent drive electrodes from the plurality of horizontally-positioned electrode chains and the plurality of vertically-positioned electrode chains; and
   activating a second phase comprising:
      operating a second electrode chain from the plurality of vertically-positioned electrode chains as a reception electrode and operating all remaining electrode chains from the plurality of vertically-positioned electrode chains as the drive electrode;
      operating the plurality of horizontally-positioned electrode chains as the drive electrode; and
      forming a second capacitance between the second electrode chain and directly-adjacent drive electrodes from the plurality of horizontally-positioned electrode chains and the plurality of vertically-positioned electrode chains.

11. The method according to claim 10, wherein the first phase further comprises operating a next electrode chain from the plurality of horizontally-positioned electrode chains as the reception electrode, wherein the next electrode chain is directly-adjacent to the first electrode chain.

12. The method according to claim 10, wherein the second phase further comprises operating a next electrode chain from a plurality of horizontally-positioned electrode chains as the reception electrode, wherein the next electrode chain is directly-adjacent to the second electrode chain.

13. The method according to claim 10, wherein operating the plurality of vertically-positioned electrode chains as the drive electrode comprises applying a drive signal to each of the vertically-positioned electrode chains.

14. The method according to claim 10, wherein operating the plurality of horizontally-positioned electrode chains as the drive electrode comprises applying a drive signal to each of the horizontally-positioned electrode chains.

15. A mutual capacitance touch sensor system, comprising:
   a touch sensor array comprising:
      a plurality of electrode chains, comprising:
         a first set of electrode chains arranged in a first direction, wherein each electrode chain from the first set of electrode chains is arranged in a zigzag pattern; and
         a second set of electrode chains arranged in a second direction, perpendicular to the first direction, wherein each electrode chain from the second set of electrode chains is arranged in a zigzag pattern;
      wherein each electrode chain, from the plurality of electrode chains, is configured to:
         receive a drive signal and operate as a drive electrode; and
         operate as a reception electrode; and
   a microprocessor coupled to the touch sensor array, wherein the microprocessor is configured to generate the drive signal and apply the drive signal to the electrode chains according to a predetermined sequence.

16. The mutual capacitance touch sensor system according to claim 15, wherein each electrode chain comprises:
   a plurality of electrode pads; and
   a plurality of connectors to electrically connect directly-adjacent electrodes pads.

17. The mutual capacitance touch sensor system according to claim 16, wherein the electrode pads are evenly-spaced relative to each other.

18. The mutual capacitance touch sensor system according to claim 16, wherein at least one electrode pad is evenly-spaced between at least four directly-adjacent electrode pads.

19. The mutual capacitance touch sensor system according to claim 18, wherein the directly-adjacent electrode pads comprise a directly-above electrode pad, a directly-below electrode pad, a directly-to-the-right electrode pad, and a directly-to-the-left electrode pad.

20. The mutual capacitance touch sensor system according to claim 15, wherein:
   the first set of electrode chains are formed on a first substrate,
   the second set of electrode chains are formed on second substrate; and
   the second substrate overlaps the first substrate.

* * * * *